(No Model.)
F. W. SIEGEL.
CHUCK.
No. 563,813.  Patented July 14, 1896.
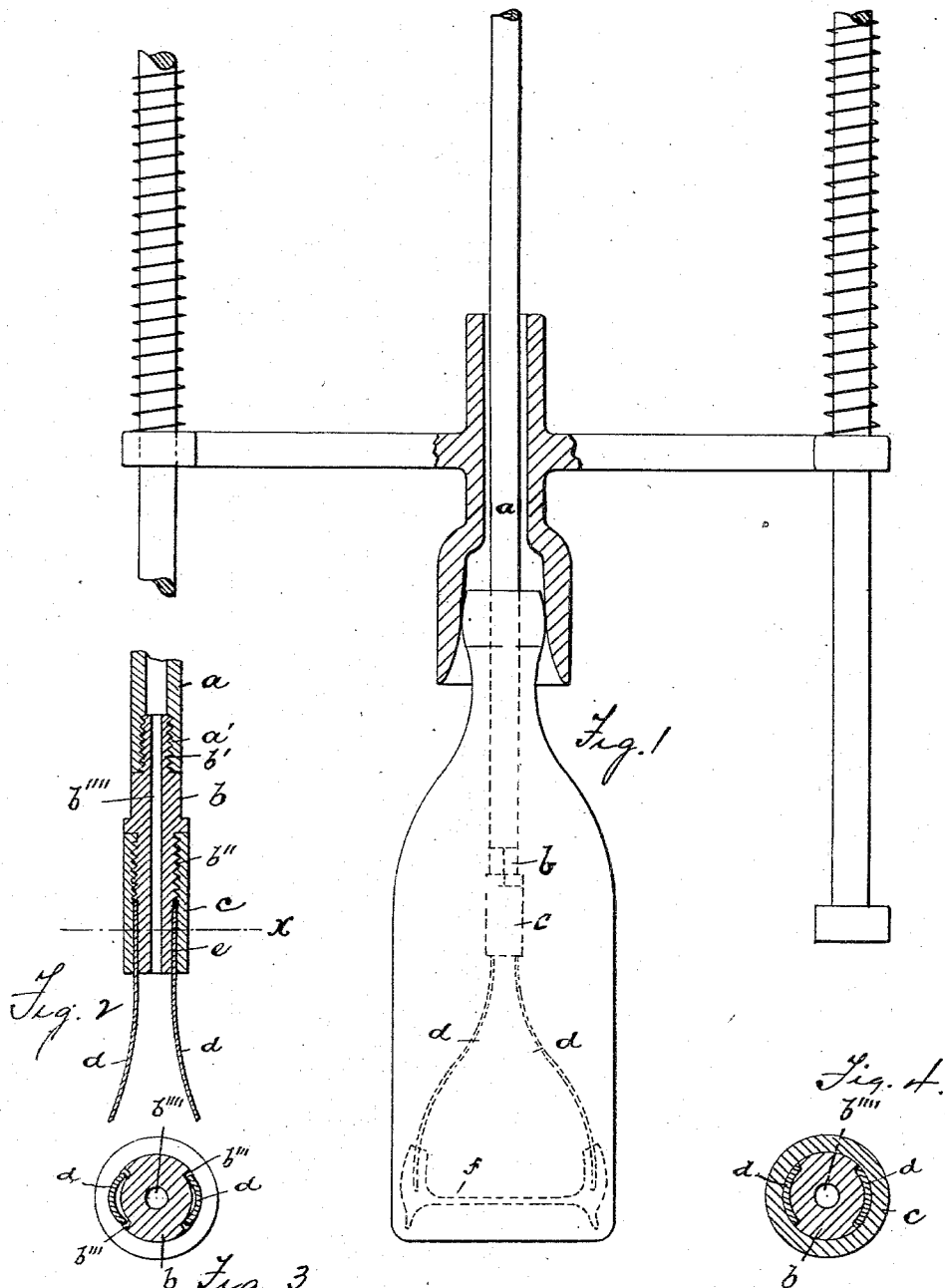
WITNESSES:
Robert Sollberger,
Beatrice Charles.
INVENTOR:
Frederick W. Siegel,
BY Drake & Co. ATTY'S.

UNITED STATES PATENT OFFICE.

FREDERICK W. SIEGEL, OF NEWARK, NEW JERSEY, ASSIGNOR TO JOSEPH FERGG, OF SAME PLACE.

CHUCK.

SPECIFICATION forming part of Letters Patent No. 563,813, dated July 14, 1896.

Application filed August 5, 1895. Serial No. 558,228. (No model.)

*To all whom it may concern:*

Be it known that I, FREDERICK W. SIEGEL, a citizen of the United States, residing at Newark, in the county of Essex and State of New Jersey, have invented certain new and useful Improvements in Spring-Holding Chucks for Bottle-Washing Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to prevent breakage of the springs which hold the washing-brush in bottle-washing machines, to secure a more perfect adjustment of the said springs upon the chuck, and to prevent said springs, in the operation of adjusting them or fastening them in the chuck, from turning out of position and thus becoming incapable of properly holding the brush. Further objects may be referred to hereinafter in connection with the description of the working parts.

The invention consists in the improved spring-holding chuck for bottle-washing machines and in the combinations and arrangements of parts, substantially as will be hereinafter set forth, and finally embraced in the clauses of the claim.

Referring to the accompanying drawings, in which like letters of reference indicate corresponding parts in each of the views, Figure 1 is a front elevation of the improved chuck arranged in a bottle-washing machine and having the springs which hold the brush arranged therein. Fig. 2 is a longitudinal section of portions of the same. Fig. 3 is a transverse section of the same, taken at line $x$, a certain collar not being in place; and Fig. 4 is a similar section with said collar in place.

In said drawings, $a$ indicates the spindle of the machine, which is provided on the lower end with a female thread $a'$, into which the chuck-body is screwed. $b$ indicates said chuck-body having a threaded shank $b'$, adapted to engage the spindle and turn therewith. Beneath this threaded shank the body of the chuck is made angular or otherwise formed to receive a wrench or other suitable tool by which the said chuck may be removed from said spindle. Below this, again, the body of the chuck is provided with another set of threads $b''$, adapted to receive a correspondingly-threaded collar $c$, and at its lower extremity the said body is recessed at $b'''$ $b'''$ on opposite sides, the recesses being shallow or of a thickness nearly corresponding with the thickness of the springs $d$, so that, as the said springs lie therein, there will be no projection or a very slight projection beyond the face or periphery of the said end. The projection, if any, of the spring beyond the flush-line is only sufficient to secure a firm grasp or binding of the collar upon the springs when said collar is brought down into position.

In the prior devices of which I am aware the spring-clamping parts presented plain circular surfaces devoid of recesses, and thus care was required to keep the springs in proper position on opposite sides of the inner member of the clamp, said springs being free to move sidewise in the annular space between the parts until finally brought into firm clamping engagement by the screwing up of said parts.

The recesses $b'''$ $b'''$, lying on opposite sides of the inner or central member $b$ in the present case, are of a width corresponding more or less closely with the width of the springs, so that when said springs are resting therein there can be no lateral movement, even though the clamps are not in final clamping relation. The sides of the lower extremity are also made slightly tapering, as at $e$ in Fig. 2, to receive a correspondingly-tapering end of the collar, by which means, when the collar is screwed up into position, it is brought hard upon the outer sides of the springs to hold them firmly against the chuck-body with great security and firmness. The inclined bearings of the chuck-body and outside collar correspond or are parallel, and thus they lie hard against the opposite sides of the springs from one end of said bearings to the other. The inclines $e$ are so disposed as to give to the opposite springs an inward extension, as in Figs. 1 and 2, so that as they project down from the chuck they approach one another slightly. The springs thus normally approaching one another as they issue from the chuck may be pressed into contact with one another without any danger of breakage, said springs thus differing from springs flaring apart from one another at the point of issuance, in which construction the danger is increased and breakage frequent. Said collar is threaded at its upper end to engage the body of the chuck and at its lower end, on the interior, is slightly tapering or funnel-shaped in correspondence with the tapering surfaces of the chuck-body. The springs $d\ d$ extend out from the chuck in converging lines, after which they turn outwardly to receive the brush and press the same against the sides of the bottle.

Heretofore in chucks for a similar purpose the chuck-body was hollow at its lower end to receive the springs and receive a screw plug or holder, which latter was inserted between the springs and projected below the extremity of the chuck-body. When the two springs were pressed together to admit of their flaring lower ends being inserted in the bottle prior to the washing operation, the said projecting plug served as a fulcrum over which the springs were pressed, the result of which construction was that the springs were frequently broken and very considerable loss thereby occasioned. Furthermore, by such construction the springs were disposed in their relation to the chuck so as to flare immediately upon their passing out from the chuck-body, and to secure the proper operation the springs were flexed more sharply and to a greater degree than by the present construction. This also, acting in connection with the projecting plug, served to produce the breakage referred to. By my improved construction these objections are all avoided. I secure a much more neat clamping of the springs in their position and also additional firmness. I avoid the breakage referred to, and the springs $d$, by lying in the recesses, as described, are prevented from working out of place when the fastening member is screwed up into position. I am able also to more quickly fasten the parts and, without care in maintaining the adjustment, secure a proper disposal of the springs in their relative positions. The "brush" (so called) is of rubber and is removably secured at the ends of the springs in the ordinary manner.

At the longitudinal axis of the chuck-body I form a water-passage $b''''$, by means of which, as the brush revolves with the spindle and chuck, the bottle is supplied with water and properly flushed.

Having thus described the invention, what I claim as new is—

1. The combination, in a bottle-washing machine, with the spindle thereof, of a chuck-body having the water-passage $b''''$, threads $b''$ and, below said threads, opposite recesses $b'''$; springs $d, d$, arranged in said opposite recesses, a collar $c$, and a brush, $f$, all arranged and combined, substantially as set forth.

2. The combination in a washing-machine, with the spindle thereof, of a chuck-body having the water-passage $b''''$, threads $b''$, and, below said threads, opposite recesses $b'''$, the lower end of said chuck-body tapering to give an inward direction to the springs, said springs, a collar and a brush, all arranged and combined, substantially as and for the purposes set forth.

In testimony that I claim the foregoing I have hereunto set my hand this 30th day of July, 1895.

FREDERICK W. SIEGEL.

Witnesses:
CHARLES H. PELL,
BEATRICE CHARLES.